United States Patent [19]

Blank

[11] 4,102,434

[45] Jul. 25, 1978

[54] COLLAPSIBLE SAWHORSE

[76] Inventor: Paul C. Blank, Del Camino Park, Rte. 4, Space 103, Longmont, Colo. 80501

[21] Appl. No.: 766,111

[22] Filed: Feb. 7, 1977

[51] Int. Cl.[2] .............................. F16M 11/00

[52] U.S. Cl. .............................. 182/181

[58] Field of Search .............................. 182/181-186, 182/224, 225, 226; 248/150, 165, 440; 256/64

[56] References Cited

U.S. PATENT DOCUMENTS

| | | | |
|---|---|---|---|
| 646,661 | 4/1900 | Hanstein | 182/181 |
| 2,816,805 | 12/1957 | Vaughn | 182/181 |
| 2,851,236 | 9/1958 | Koller | 248/165 |
| 2,964,123 | 12/1960 | Larson | 182/181 |
| 3,089,682 | 5/1963 | Parker | 182/181 |
| 3,633,859 | 1/1972 | Vosbikian | 248/165 |
| 3,799,507 | 3/1974 | Rizzo | 256/64 |

*Primary Examiner*—Reinaldo P. Machado

*Attorney, Agent, or Firm*—O'Rourke & Harris

[57] ABSTRACT

A collapsible sawhorse is disclosed that includes an elongated beam supported at opposite ends by tubular supports. Each support includes a pair of tubular elements with the upper portions of the supports being received in channel guides fastened to opposite sides of the beam at each end portion. The tubular elements are downwardly divergent with respect to one another from the upper portion and are received in L-shaped sockets at the bottom with the sockets forming the feet of the sawhorse device. A pair of struts extend between different sockets between the supports with the central portion of the struts being fastened together when the device is assembled with the central portion slightly above the plane of the bottom of the feet formed by the sockets. The device is readily assembled and disassembled with the device, when disassembled, being compactly bundled for storage and/or transporting.

11 Claims, 4 Drawing Figures

COLLAPSIBLE SAWHORSE

FIELD OF THE INVENTION

This invention relates to a sawhorse device and, more particularly, relates to a collapsible sawhorse device.

BACKGROUND OF THE INVENTION

It is oftentimes necessary, or at least desirable, to have a sturdy temporary structure that is dependable for its intended purpose. This is true, for example, where a structure such as a scaffold or the like is needed to support the weight of one or more workers, and is likewise necessary, where the work itself is to be supported as, for example, by one or more sawhorses. In addition, it is often necessary to provide a dependable temporary structure that is easily transportable and/or may be compactly stored when not in use.

Various sawhorse, trestle and/or scaffold structures have been heretofore suggested and/or utilized for diverse purposes including those indicated hereinabove. Among such structures are collapsible devices such as shown, for example, in U.S. Patent Nos.: 978,403; 1,450,869; 1,936,196; 2,427,540; 2,793,916; 2,816,805; 2,897,911; 3,175,642; 3,180,452; 3,547,227; 3,583,676; 3,666,047; and 3,763,958.

Prior art structures often have included struts connected between the legs at each end of the beam support (such as shown, for example, in U.S. Pat. Nos. 1,450,869; 1,936,196; 2,816,805; 3,583,676; and 3,763,958), and some prior art has shown struts extending between legs of opposite end supports (such as shown, for example, by U.S. Pat. Nos. 2,427,540 and 2,793,916). In addition, struts at ground level have been shown to extend parallel to a body or beam (as shown by U.S. Pat. No. 2,427,540), and strut locking bars extending between struts attached to opposite legs of a trestle (as shown in U.S. Pat. No. 2,793,916) have been heretofore suggested. Also, the use of sockets in connection with tubular legs in a collapsible trestle (as shown in U.S. Pat. No. 2,897,911) has been heretofore suggested and clips attached to a beam have been heretofore suggested for releasably receiving the tubular rods of a collapsible sawhorse (as shown in U.S. Pat. No. 3,763,958).

Improvements in collapsible sawhorses are still thought to be needed, however, and this invention is directed to that end.

SUMMARY OF THE INVENTION

This invention provides an improved and dependably sturdy sawhorse device that can be readily assembled and disassembled as well as being compactly stored and/or transported when disassembled. The device includes an elongated beam supported at opposite ends by tubular elements the upper portions of which are received in guides connected at the opposite end portions of the elongated beam and the lower portions of which are releasably received in sockets with the sockets forming the feet of the device which have tubular struts extending between opposite supports and with the central portion of the struts being connected and slightly raised with respect to the bottom of the feet to thus provide a sturdy sawhorse when assembled.

It is therefore an object of this invention to provide an improved device such as a sawhorse, trestle and/or scaffold.

It is another object of this invention to provide an improved sawhorse device that is readily assembled and disassembled.

It is still another object of this invention to provide an improved sawhorse device that is dependably sturdy when assembled.

It is yet another object of this invention to provide an improved sawhorse device that can be compactly bundled for storage and/or transporting when disassembled.

It is yet another object of this invention to provide an improved sawhorse device that has tubular supports and connecting studs, end portions of which are received in sockets forming the feet of the device when assembled.

It is still another object of this invention to provide an improved sawhorse device that has first and second supporting assemblies each of which has upper portions supporting opposite ends of an elongated beam and lower portions that form the feet of the device with the feet having struts connected therebetween when assembled.

It is yet another object of this invention to provide an improved sawhorse device that has first and second supporting assemblies each of which include first and second tubular supports having arms that are received in guides at opposite ends of an elongated beam and legs which are received in sockets forming the feet of the device with the feet being connected by first and second struts extending between sockets in opposite supports and having central portions that are connected and raised with respect to the bottom of the feet formed by the sockets.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
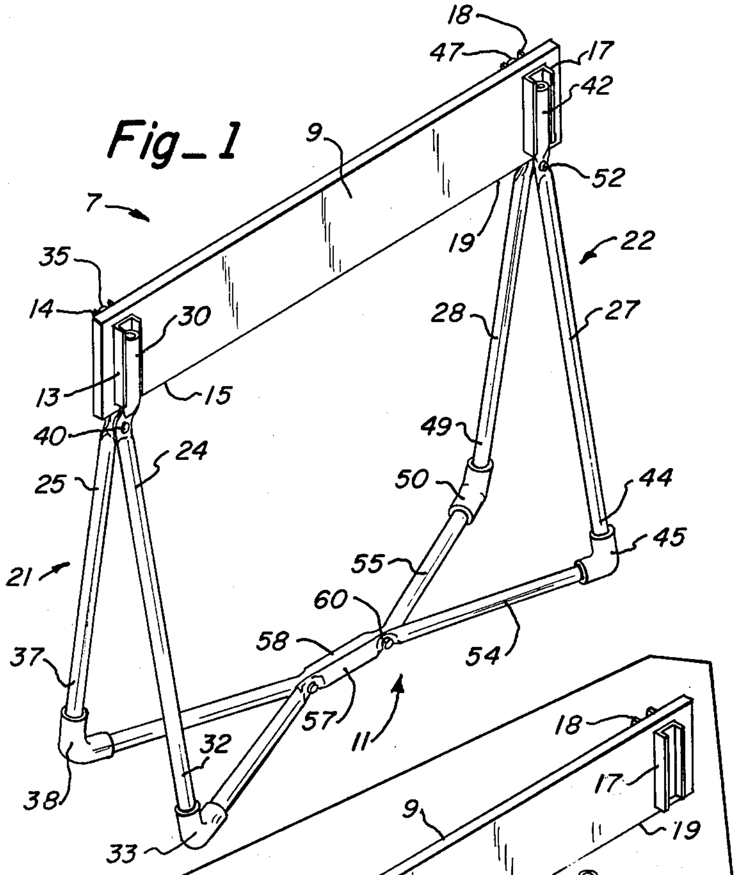
FIG. 1 is a perspective view of the sawhorse device of this invention.

Referring now to the drawings, the sawhorse device 7 of this invention is shown to include an elongated, horizontally positioned beam, or rail, 9, supported by a beam positioning unit 11. While device 7 is referred to herein as a sawhorse, it could obviously also be a trestle or scaffold structure and as used herein sawhorse is meant to include such structures.

Beam 9 is preferably a wood plank and has a first pair of guides 13 and 14 conventionally fastened at one end portion 15 and a second pair of guides 17 and 18 conventionally fastened at the other end portion 19. Each of the guides, as shown best in FIG. 2, is preferably of metal such as aluminum and has a channel configuration, and each pair of guides is aligned at opposite sides of the plank with the channels facing outwardly from the plank and extending vertically when the plank is positioned for normal, or assembled, use (as shown in FIG. 1).

Beam positioning unit 11 is preferably of tubular aluminum material and includes support assemblies 21 and 22 with support assembly 21 including a pair of tubular elements 24 and 25 and support assembly 22 including a pair of tubular elements 27 and 28.

Figure 2:
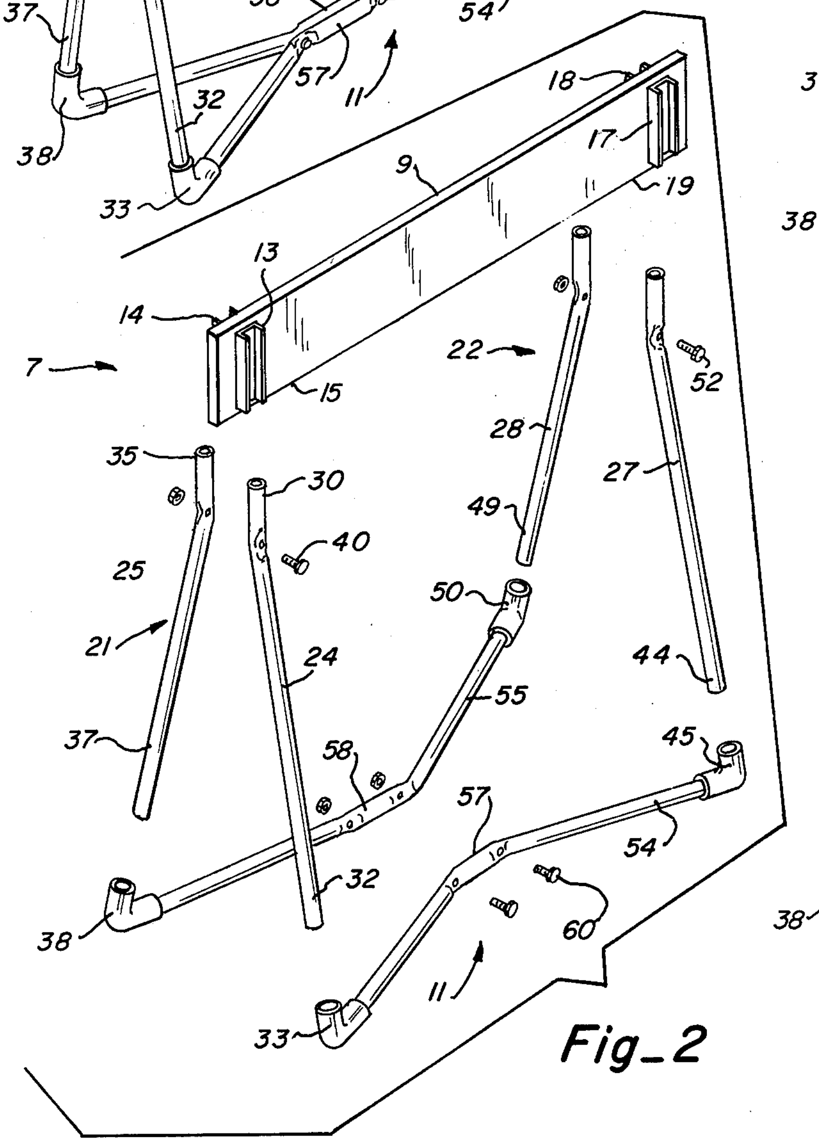
FIG. 2 is an exploded perspective view of the sawhorse device as shown in FIG. 1.

Tubular element 24 includes an upper, beam engaging portion 30 that is received in channel 13 on beam 9 when the sawhorse device is assembled, as is best shown in FIG. 1. Tubular element 24 also includes an outwardly and downwardly sloping tubular leg portion 32 the lower end of which is received in L-shaped socket 33 with socket 33 forming one foot of the sawhorse device when assembled.

Likewise, tubular element 25 of support assembly 21 includes an upper, beam engaging portion 35 that is received in channel 14 on beam 9 when the sawhorse device is assembled. Tubular element 25 also includes an outwardly and downwardly sloping tubular leg portion 37 the lower end of which is received in L-shaped socket 38 with socket 38 forming thesecond foot of support assembly 21 for the sawhorse device when assembled.

Figure 3:
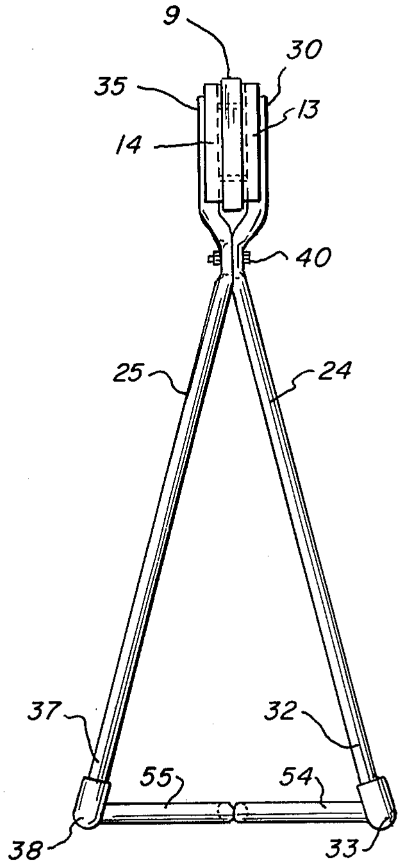
FIG. 3 is an end view of the sawhorse device shown in FIG. 1.

As can be seen from FIGS. 1 and 3 of the drawings, tubular elements 24 and 25 are aligned and form an A frame when assembled with end portion 15 of beam 9 held by and between the upper portions 30 and 35 of the support assembly. A fastener, or connector, 40, such as a nut and bolt, for example, may be used to fasten the tubular elements 24 and 25 together just below beam 9, when the sawhorse device is assembled.

Support assembly 22 is identical to support assembly 21 with tubular element 27 having an upper, beam engaging portion 42 that is received in channel 17 on beam 9 when the sawhorse device is assembled. Tubular element 27 also includes an outwardly and downwardly sloping tubular leg portion 44 the lower end of which is received in L-shaped socket 45 with socket 45 forming one foot of support assembly 22.

Tubular element 28 includes an upper, beam engaging portion 47 that is received in channel 18 on beam 9 when the sawhorse device is assembled. Tubular element 28 also includes an outwardly and downwardly sloping tubular leg portion 49 the lower end of which is received in L-shaped socket 50 with socket 50 forming the other foot for support assembly 22.

The tubular elements 27 and 28 of support assembly 22 are also aligned, as are the elements of support assembly 21, to form an A frame when the sawhorse device is assembled with upper portions 42 and 47 holding end portion 19 of beam 9 therebetween. A fastener, or connector, 52, again such as a nut and bolt, can be utilized to fasten tubular elements 27 and 28 together just below beam 9 when the sawhorse device is assembled.

A pair of struts, 54 and 55 are connected between the feet, or sockets, of the support assembly. As shown in FIG. 1, strut 54 has opposite ends received in sockets 33 and 45 of support assemblies 21 and 22, respectively, while strut 55 has opposite ends received in sockets 38 and 50 of support assemblies 21 and 22, respectively. Struts 54 and 55 extend inwardly from the sockets so that the central portions 57 and 58, respectively, are contiguous. A fastener, or connector, 60, such as a nut and bolt, is utilized to hold the struts together when the sawhorse device is assembled. As can be seen from FIGS. 1 and 3, the central portions 57 and 58 of the struts are slightly raised with respect to the plane passing through the bottom of the feet (i.e. at the bottom of the sockets) so that only the feet rest on the ground or floor (not shown) when the device is in the normal assembled position for use. Although not shown, the struts could be curved inwardly and upwardly, if desired, to further increase the spacing between the central portions of the struts and the floor or ground.

Figure 4:
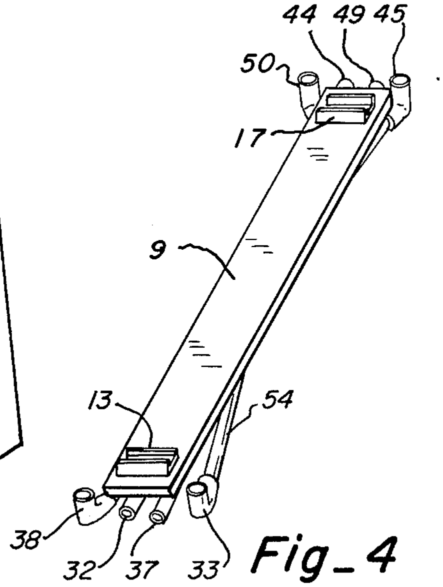
FIG. 4 is a perspective view of the sawhorse device disassembled and compactly bundled.

When the sawhorse device is disassembled, it may be bundled into a compact unit for storage and/or transporting as shown in FIG. 4. As shown, the sockets are retained on the struts but the sockets could, if desired, be retained on the legs of the support assemblies.

The device may be quickly and readily assembled to form a sturdy sawhorse. FIG. 2 shows an exploded view of the sawhorse device. For assembly, the tubular elements forming the support assemblies are pressed into the four sockets on the struts. The beam is then lowered into position with the channels receiving the upper portions of the tubular elements of the support assemblies. This is facilitated by a wide space between the upper portions of each pair of tubular elements of the support assemblies as made possible by raising the central portions of the struts upwardly from the floor or ground. By then pushing down on the central portions of the struts, the upper portions of the tubular elements of the support assemblies are urged toward one another to clamp the beam therebetween. This places a tension on the entire structure and makes it sturdy. Fasteners (usually nuts and bolts) are then applied between the tubular elements of the support assemblies just below the beam and to the central portion of the struts to thus complete the assembly.

For disassembly, the fasteners are removed and the beam lifted from between the upper portion of the tubular elements of the support assemblies. The tubular elements of the support assemblies are then pulled from the sockets (or alternately, the struts could be pulled from the sockets) and the disassembled parts then bundled into a tight package for storage and/or transporting as shown in FIG. 4. When bundled, the compact package is light in weight and easily carried or stored in a minimum of space.

As can be appreciated from the foregoing, if any part such as the beam becomes damaged, it can be readily replaced.

Thus, the device of this invention provides a unit that is quickly assembled and disassembled, may be compactly bundled when disassembled, and also provides a sturdy sawhorse when assembled.

What is claimed is:

1. A sawhorse device, comprising:

an elongated beam having first and second opposite end portions;

guide means on said opposite end portions of said elongated beam;

a first support assembly including a top portion receivable in said guide means at said first end portion of said elongated beam and a bottom portion having a pair of spaced feet;

a second support assembly including a top portion receivable in said guide means at said second end portion of said elongated beam and a bottom portion having a pair of spaced feet; and feet connecting means extending between said feet of said first and second support assemblies, said feet connecting means having opposite end portions engaging different ones of said feet and a central portion that is raised at least slightly with respect to a plane through the bottom of said spaced feet.

2. The sawhorse device of claim 1 wherein said top portions of said first and second support assemblies each include a pair of upwardly directed arms, and wherein said guide means on said elongated beam includes guides on opposite sides of each of said end portions of said elongated beam with said arms being spaced to be received in said guides without rigidly clamping said beam between said arms of said first and second support assemblies.

3. The sawhorse device of claim 1 wherein the bottom portions of said first and second support assemblies each includes a pair of downwardly diverging legs that terminate in sockets forming said feet, and wherein said feet connecting means includes a pair of struts one of which is connected between one socket of each of said first and second support assemblies and the other of which is connected between the other of said sockets of each of said first and second support assemblies.

4. The sawhorse device of claim 4 wherein said struts extend inwardly from said sockets forming said feet so as to converge toward one another at the central portions with said central portions being releasably connected together when the device is in the assembled state for use.

5. The sawhorse device of claim 1 wherein said first and second support assemblies and said feet connecting means are readily releasable at said sockets whereby said device may be quickly assembled and disassembled.

6. A sawhorse device, comprising:

an elongated beam having first and second opposite end portions;

a first support assembly having a pair of tubular elements the upper portions of which are spaced to receive and engage opposite sides of said opposite end portions of said elongated beam when said device is assembled, said lower portions of said tubular elements being downwardly divergent with respect to one another and terminating in a first pair of sockets forming spaced feet for said device;

a second support assembly having a pair of tubular elements the upper portions of which are spaced to receive and engage opposite sides of said opposite end portions of said elongated beam when said device is assembled, and said lower portion of said tubular elements being downwardly divergent with respect to one another and terminating in a second pair of sockets forming spaced feet for said device; and feet connecting means extending between said first and second pairs of sockets when said device is assembled, said feet connecting means including a pair of struts extending between different ones of said sockets of each of said pairs of sockets, said struts being configured so that the central portions are contiguous when the device is assembled with said contiguous central portions of said struts being above a plane extending through the bottom of said feet when said device is assembled for use whereby the sturdiness of said sawhorse is enhanced.

7. The sawhorse device of claim 6 wherein said tubular elements are removable from said sockets for disassembly of said device so that said disassembled device may be compactly bundled for transporting and storage.

8. The sawhorse device of claim 6 wherein said elongated beam includes guides at opposite sides of said beam at each of said portions, and wherein the upper portions of said support assemblies are received in said guides without rigid clamping of said elongated beam therebetween when said device is assembled whereby the sturdiness of said device is enhanced.

9. A sawhorse device, comprising:

an elongated plank having first and second end portions each of which has a pair of outwardly directed narrow width channels fastened thereto at opposite sides of said plank;

a first support assembly having first and second tubular rods each of which includes an upper plank engaging portion that is received in a different one of said channels at said first end portion of said plank when said device is assembled to maintain said first end portion of said plank therebetween without rigid clamping of said first end portion between said first and second tubular rods, said tubular rods being downwardly and outwardly divergent with respect to one another and each being received in different ones of first and second L-shaped sockets at the lower end with said sockets forming feet for said device when assembled;

a second support assembly having third and fourth tubular rods each of which includes an upper plank engaging portion that is received in a different one of said channels at said second end portion of said plank when said device is assembled to maintain said second end portion of said plank therebetween without rigid clamping of said second end portion between said third and fourth tubular rods, said tubular rods being downwardly and outwardly divergent with respect to one another and each being received in different ones of third and fourth L-shaped sockets at the lower end with said sockets forming feet for said device when assembled; and first and second struts of tubular material, said first strut having opposite end portions received in said first and third L-shaped sockets and said second strut having opposite end portions received in said second and fourth L-shaped sockets, said struts being configured so that the central portions are contiguous when said device is assembled with said contiguous central portions being above a plane through the bottom of the feet of said device.

10. The sawhorse device of claim 9 wherein said device includes first fastening means for releasably fastening said central portions of said struts together, and second and third fastening means for releasably fastening the tubular rods of said first and second support assemblies whereby when assembled said device is sturdy with said plank being maintained in the desired position.

11. The sawhorse device of claim 10 wherein said rods and struts are readily disassembled by removal of said fastening means therefrom and removal of at least one of said rods and struts from said sockets whereby said device when disassembled may be stored and transported in a compact form.

* * * * *

UNITED STATES PATENT OFFICE
CERTIFICATE OF CORRECTION

PATENT NO. : 4,102,434
DATED : July 25, 1978
INVENTOR(S) : Paul C. Blank

It is certified that error appears in the above-identified patent and that said Letters Patent are hereby corrected as shown below:

Column 3, line 28, "thesecond" should be ---the second---.
Column 5, line 28, claim 4, "4" should be ---3---.

Signed and Sealed this

*Sixth* Day of *February 1979*

[SEAL]

*Attest:*

RUTH C. MASON
*Attesting Officer*

DONALD W. BANNER
*Commissioner of Patents and Trademarks*